US009014765B2

(12) United States Patent
Qi et al.

(10) Patent No.: US 9,014,765 B2
(45) Date of Patent: Apr. 21, 2015

(54) MOBILE PLATFORM TRACKING IN WIRELESS NETWORKS

(75) Inventors: Emily H. Qi, Portland, OR (US); Jr-Shian Tsai, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1011 days.

(21) Appl. No.: 11/712,059

(22) Filed: Feb. 28, 2007

(65) Prior Publication Data

US 2008/0207278 A1 Aug. 28, 2008

(51) Int. Cl.
*H04M 1/00* (2006.01)
*H04W 60/02* (2009.01)
*H04W 52/02* (2009.01)

(52) U.S. Cl.
CPC .......... *H04W 60/02* (2013.01); *H04M 2250/06* (2013.01); *H04W 52/0229* (2013.01); *Y02B 60/50* (2013.01)

(58) Field of Classification Search
CPC ............ H04W 60/02; H04W 52/0229; H04M 2250/06; Y02B 60/50
USPC ................. 455/575, 572–574, 576, 410–411; 340/572.1; 726/34–35; 713/320, 323; 342/27–28
See application file for complete search history.

(56) References Cited

U.S. PATENT DOCUMENTS

| | | | |
|---|---|---|---|
| 5,655,219 A | 8/1997 | Jusa et al. | |
| 6,512,935 B1 * | 1/2003 | Redi | 455/574 |
| 6,700,493 B1 * | 3/2004 | Robinson | 340/573.1 |
| 6,972,683 B2 * | 12/2005 | Lestienne et al. | 340/572.1 |
| 7,171,187 B2 * | 1/2007 | Haave et al. | 455/404.2 |
| 7,312,752 B2 * | 12/2007 | Smith et al. | 342/464 |
| 7,313,420 B2 * | 12/2007 | Suda et al. | 455/574 |
| 7,519,401 B2 * | 4/2009 | Nader et al. | 455/574 |
| 7,525,436 B2 * | 4/2009 | Mickle et al. | 340/572.1 |
| 7,548,203 B2 * | 6/2009 | Kalliola et al. | 342/418 |
| 7,949,376 B2 * | 5/2011 | Maekawa | 455/574 |
| 2003/0090387 A1 * | 5/2003 | Lestienne et al. | 340/825.49 |
| 2004/0042417 A1 | 3/2004 | Kennedy | |
| 2005/0014482 A1 | 1/2005 | Holland et al. | |
| 2005/0037781 A1 * | 2/2005 | Ozugur et al. | 455/458 |
| 2005/0219120 A1 | 10/2005 | Chang | |
| 2006/0125694 A1 | 6/2006 | Dejanovic et al. | |

(Continued)

FOREIGN PATENT DOCUMENTS

JP 6261043 9/1994
JP 9331571 12/1997

(Continued)

OTHER PUBLICATIONS

Rajendran, N. et al., "WATS_SN: A Wireless Asset Tracking System Using Sensor Networks", *2005 IEEE International Conference on Personal Wireless Communications*( ICPWC2005), (Jan. 2005), pp. 237-243.

(Continued)

*Primary Examiner* — Khawar Iqbal
(74) *Attorney, Agent, or Firm* — John F. Travis

(57) ABSTRACT

A mobile station in a wireless network provides a presence indication when in a power saving state. The presence indication is sent periodically, and the period is dependent on whether the mobile station is stationary or in motion. The period may also be dependent on an asset protection level of the mobile station.

25 Claims, 6 Drawing Sheets

(56) References Cited

U.S. PATENT DOCUMENTS

| | | | |
|---|---|---|---|
| 2006/0160545 A1 | 7/2006 | Goren et al. | |
| 2006/0221900 A1* | 10/2006 | Zhang et al. | 370/331 |
| 2007/0140256 A1* | 6/2007 | Yaqub | 370/395.5 |
| 2008/0062957 A1* | 3/2008 | Narasimha et al. | 370/350 |
| 2008/0112346 A1* | 5/2008 | Tolpin et al. | 370/311 |
| 2008/0119209 A1* | 5/2008 | Upp | 455/458 |
| 2010/0060455 A1* | 3/2010 | Frabasile | 340/572.4 |
| 2010/0091714 A1* | 4/2010 | Bennett | 370/328 |

FOREIGN PATENT DOCUMENTS

| | | | |
|---|---|---|---|
| JP | 2006515491 | 5/2006 | |
| JP | 2006153695 * | 6/2006 | G01S 5/14 |
| WO | WO-03023501 A2 | 3/2003 | |
| WO | 03032501 A2 | 4/2003 | |
| WO | WO-03032501 A2 | 4/2003 | |
| WO | 2004098093 | 11/2004 | |
| WO | 2005/062066 A2 | 7/2005 | |
| WO | 2008106390 A1 | 9/2008 | |

OTHER PUBLICATIONS

International Search Report/Written Opinion for PCT Patent Application No. PCT/US2008/054858 mailed Jul. 29, 2008, 9 pgs.

Office action received for Russian Patent Application No. 2009130471, mailed on Oct. 25, 2010, 6 pages of Office action including 2 pages of English translation.

Office Action received for Chinese Patent Application No. 200880001488.2, mailed Oct. 25, 2012, 7 pages including 4 pages English translation.

Office Action received for Japanese patent Application No. 2009-550632 , mailed Dec. 13, 2011, 6 pgs. including 3 pgs. English translation.

European Search Report received for European Patent Application No. 08730620.5, mailed Feb. 27, 2013, 7 pages.

Office Action received for Japanese Patent Application No. 2009-550632, mailed Feb. 12, 2013, 6 pages including 3 pages English translation.

Office Action received for Chinese Patent Application No. 200880001488.2, mailed Apr. 6, 2012, 2 Pages of Office Action and 3 Pages of English translation.

Office Action received for Korean Patent Application No. 10-2009-7013430, mailed Jan. 12, 2011, 1 Page of English translation Only.

International Preliminary Report on Patentability for PCT Patent Application No. PCT/US2008/054858 mailed Sep. 11, 2009, 6 Pages.

Supplementary European Search Report received for Patent Application No. 08730620.5, mailed Mar. 15, 2013, 1 Page.

* cited by examiner

MOBILE PLATFORM TRACKING IN WIRELESS NETWORKS

FIELD

The present invention relates generally to asset tracking, and more specifically to asset tracking in wireless networks.

BACKGROUND

Information technology (IT) asset tracking is becoming prominent in enterprise. Mobile stations in wireless networks can be tracked as assets based on their location within the network. When mobile stations enter power saving states, asset tracking may become more challenging.

DESCRIPTION OF EMBODIMENTS

Figure 1:
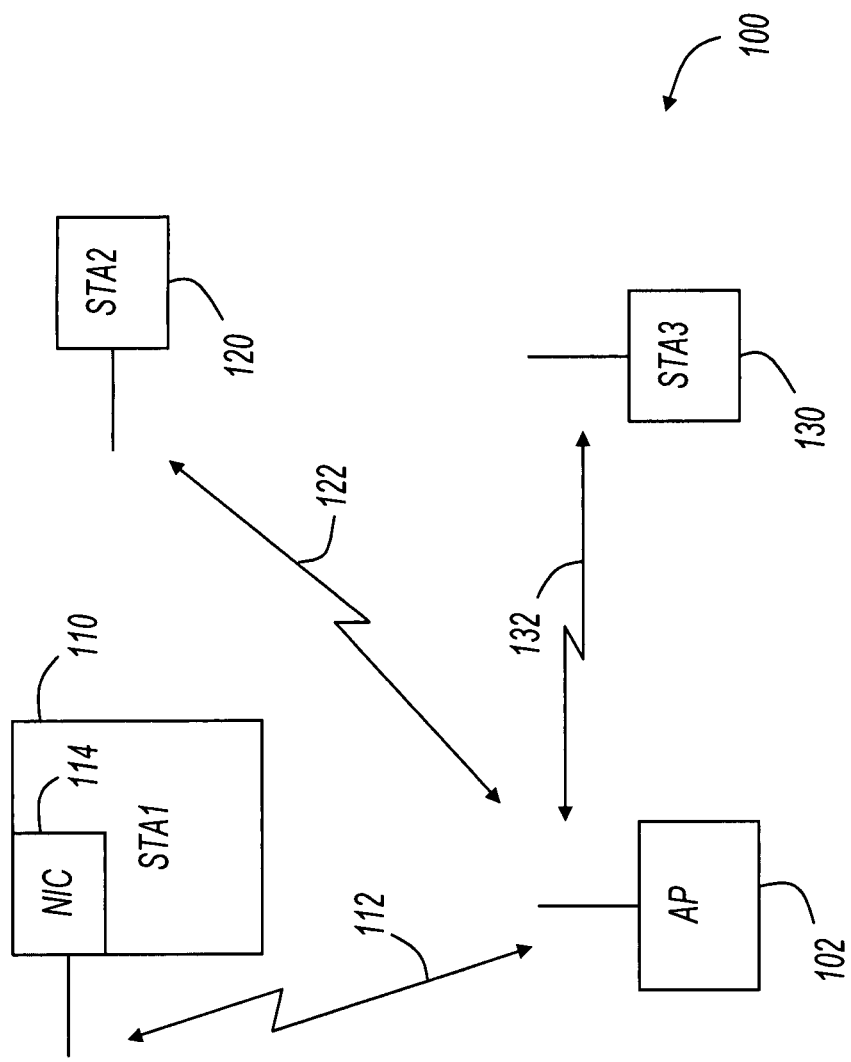
FIG. 1 shows a diagram of a wireless network.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a diagram of a wireless network. Wireless network 100 includes access point (AP) 102 and mobile stations (STA) 110, 120, and 130. In some embodiments, wireless network 100 is a wireless local area network (WLAN). For example, one or more of mobile stations 110, 120, and 130, or access point 102 may operate in compliance with a wireless network standard such as ANSI/IEEE Std. 802.11, 1999 Edition, although this is not a limitation of the present invention. Further, AP 102 and mobile stations 110, 120, and 130 may operate in compliance with IEEE 802.11v and may provide asset tracking. For example, mobile stations 110, 120, and 130 may periodically provide "presence" information to AP 102, thereby allowing the mobile stations to be tracked as assets. Various embodiments of the present invention provide asset tracking in accordance with an 802.11 standard, and other embodiments provide asset tracking not in accordance with, or only partially in accordance with, an 802.11 standard. As used herein, the term "802.11" refers to any past, present, or future IEEE 802.11 standard, including, but not limited to, the 1999 edition.

Mobile stations 110, 120, and 130 may be any type of mobile computing device capable of communicating in network 100. For example, the mobile stations may be computers, personal digital assistants, wireless-capable cellular phones, or the like. Access point 102 communicates with mobile station 110 (also referred to as "STA1") using signal 112. Access point 102 communicates with mobile station 120 (also referred to as "STA2") using signal 122, and access point 102 communicates with mobile station 130 (also referred to as "STA3") using signal 132.

One or more of mobile stations 110, 120, and 130 may be capable of saving power by entering one of many different possible power savings modes or power saving states (PSS). When a mobile station is in a power saving state, all or a portion of the mobile station may be powered down to reduce power consumption. Multiple power saving states may exist. For example, a mobile station may enter a "suspend mode" or a "hibernate mode" to save power. Power saving states may be referred to as "sleep mode," "suspend mode," "hibernate mode," or the like. Any terminology may be used to describe low power states without departing from the scope of the present invention.

Mobile station 110 includes network interface card (NIC) 114. In some embodiments, mobile station 110 may be a computer such as a notebook computer or a desktop computer that includes NIC 114. Mobile stations 120 and 130 are shown without NICs. In some embodiments, mobile stations 120 and 130 may be wireless devices that have built-in wireless capability. For example, mobile station 120 may be a notebook computer having a chipset with built-in wireless connectivity capability. In various power saving states, NIC 114 may be powered down separately from the remainder of mobile station 110. For example, NIC 114 may be powered down by itself, while the remainder of mobile station 110 remains powered up. Also for example, NIC 114 may be powered down along with a majority of the remainder of mobile station 110. Any combination of circuits may be powered down in various power saving states without departing from the scope of the present invention.

Various embodiments of the present invention allow location tracking of mobile stations in wireless networks while allowing the mobile stations to enter power savings states. Embodiments are further described with respect to asset tracking for laptop computers, but the invention is not so limited. Any asset having a power saving state may be tracked using the invention embodiments described herein.

Today, most laptop thefts happen when a laptop is "closed-lid", which usually places the laptop in a power saving state. In some embodiments of the present invention, laptop computers in power saving states periodically provide presence indications to access points to provide asset tracking and management. A laptop in a power saving state periodically "wakes" to provide the presence indication.

The time period that a mobile station remains in a power saving state between waking to provide presence indications is referred to herein as a "power saving interval." Various embodiments of the present invention provide for multiple possible time values for a power saving interval. For example, a station may select the length of a power saving interval based on whether the station is mobile or stationary. Further, a station may select the length of a power saving interval based on configuration information. The configuration information may be provided by a user or a network administrator, and may include information such as an asset protection level.

As described more fully below, shorter power saving intervals may be selected for stations with a high asset protection level or for stations that are in motion, and longer power saving intervals may be selected for stations with a low asset protection level or for stations that are stationary. By allowing mobile stations to indicate their presence while in power saving states, the various embodiments of the present invention reduce power consumption and extend the battery life while providing asset tracking manageability.

Figure 2:
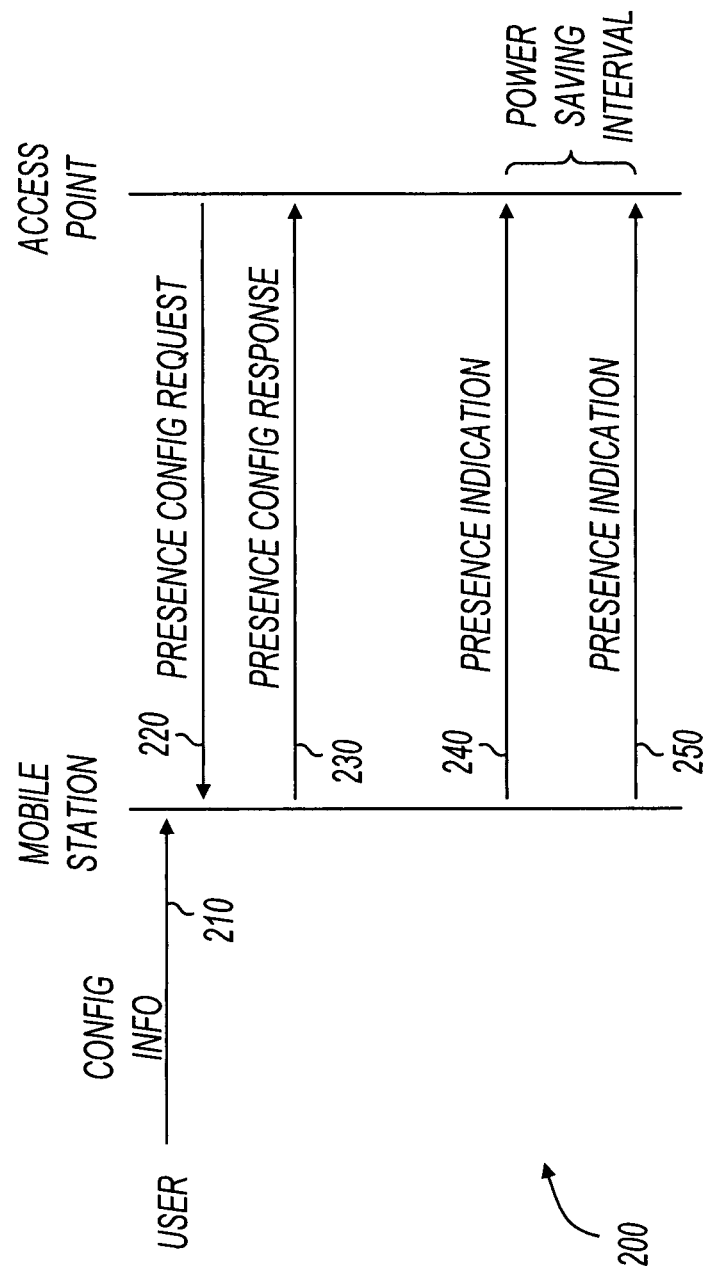
FIG. 2 shows a sequence of communications and actions in a wireless network.

FIG. 2 shows a sequence of communications and actions in a wireless network. Sequence 200 includes communications between a user and a mobile station, and between an access point and a mobile station such as access point 102 and mobile station 110 (FIG. 1). As shown in FIG. 2, time progresses from the top of sequence 200 to the bottom of sequence 200. During sequence 200, the mobile station is provided with configuration information by a user and/or access point, and the mobile station then periodically provides presence indications. The various embodiments of interaction shown between an access point and mobile stations are also further described below with reference to FIGS. 4 and 5 which show flowcharts of methods performed by an access point and a mobile station, respectively.

At 210, a user provides configuration information to the mobile station. In some embodiments, this may correspond to providing an asset protection level to the mobile station. For example, in some embodiments, a user may provide a higher asset protection level to a laptop with sensitive information stored on a hard disk. Also for example, the interaction at 210 may correspond to a network administrator providing an asset protection level that cannot be modified by a user having lesser privileges.

Once a mobile station is associated with an access point, the mobile station and access point may communicate to determine appropriate power saving interval(s) for the mobile station to use when in a power saving state. These AP/STA communications are shown at 220 and 230. At 220, the access point transmits a "presence configuration request" to the mobile station, and 230 the mobile station transmits a "presence configuration response" to the access point. The presence configuration request may include many fields, including:

Maximum stationary power saving interval
Maximum in-motion power saving interval
Nominal stationary power saving interval
Nominal in-motion power saving interval The presence configuration request fields may have any values. For example, the maximum stationary power saving interval may be larger or smaller than the maximum in-motion power saving interval. In some embodiments, the value of the maximum in-motion power saving interval is equal to the value of the maximum stationary power saving interval. Further, the nominal stationary power saving interval may be larger or smaller than the nominal in-motion power saving interval. In some embodiments, the value of the nominal in-motion power saving interval is equal to the value of the nominal stationary power saving interval.

Figure 3:
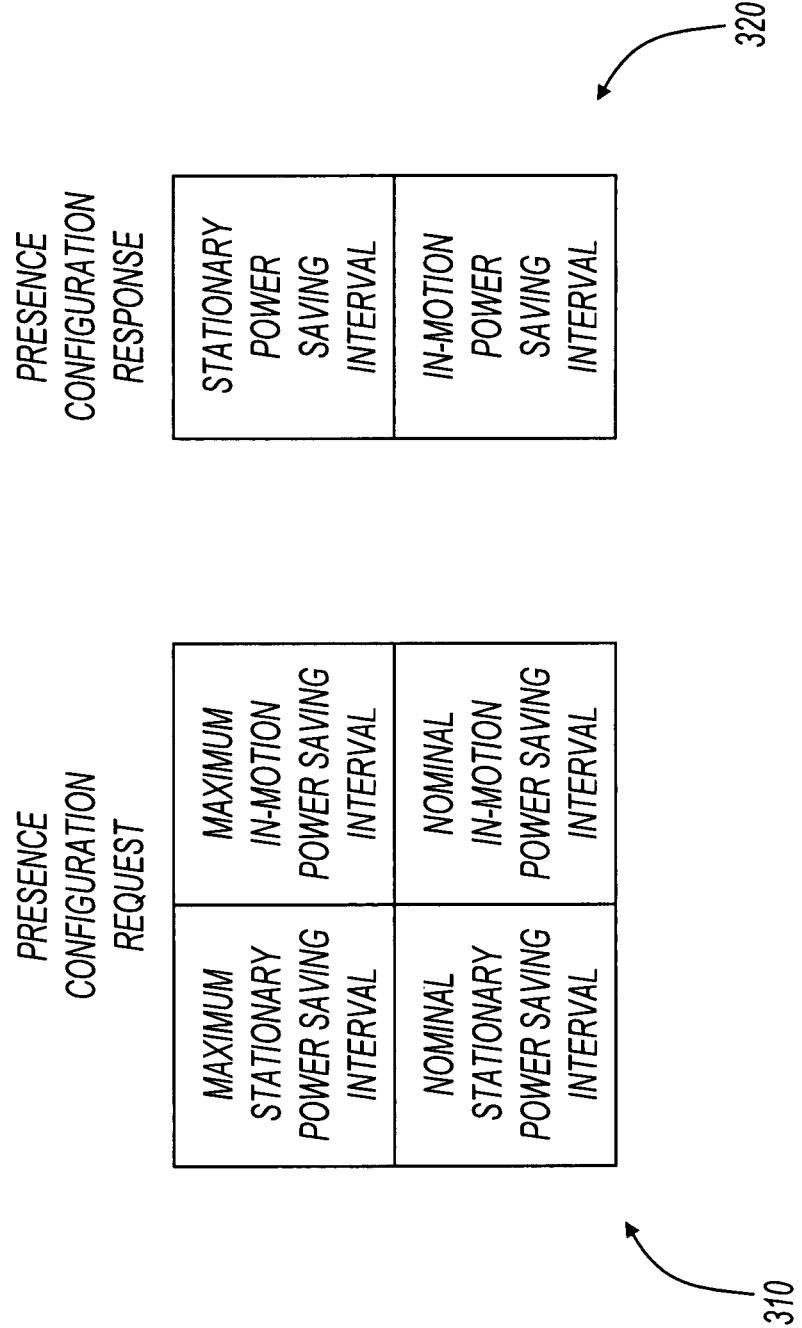
FIG. 3 shows configuration information transmitted between wireless network nodes.

An example presence configuration request 310 is shown in FIG. 3. When the mobile station receives the presence configuration request, the mobile station determines a stationary power saving interval and an in-motion power saving interval. This determination is based, at least in part, on the information received in the presence configuration request received at 220, and also based on the configuration information received at 210. As described above, the configuration information may include an asset protection level configured through a user profile, user interface, or some other method. In some embodiments, the asset protection level can be set to one of these values: Low, Medium or High. If the asset protection level is set to Low, the station may use the maximum power saving interval provided by the access point. If the asset protection level is set to High, the station may use the nominal stationary interval and nominal in-motion interval provided by the access point. If the asset protection level is set to Medium, the station may set a value between the maximum power saving interval and the normal interval for both the stationary power saving interval and the in-motion power saving interval.

The example of the previous paragraph describes three discrete asset protection levels, and three different settings for each of the stationary power saving interval and the in-motion power saving interval. In some embodiments, the asset protection level may be selected from a much larger number of possible settings, and the corresponding power saving intervals may also be selected from much larger set of possible values.

Once the station determines both the stationary power saving interval and the in-motion power saving interval, the station includes these two additional fields in a presence configuration response to be sent back to the access point (shown at 230, FIG. 2).

Stationary power saving interval
In-motion power saving interval

A presence configuration response 320 is shown in FIG. 3. The presence configuration response may include much information in addition to the stationary and in-motion power saving intervals. In some embodiments, the presence configuration response may be compliant with a standard such as 802.11v, and in other embodiments, the presence configuration response is not necessarily in compliance with a network standard.

After the presence configuration shown at 220 and 230, the mobile station has determined a stationary power saving interval and an in-motion power saving interval, and has communicated them to the access point. During subsequent operation when the mobile station is in a power saving state, the mobile station provides presence indications at either the stationary or in-motion power saving intervals, based on whether the mobile station is stationary or in motion.

When the station is in a power saving state, it will wake periodically to provide a presence indication to one or more access points. For example, when the station is stationary, it wakes at the end of every stationary power saving interval to provide a presence indication. Also for example, when the station is in motion, it wakes at the end of every in-motion power saving interval to provide a presence indication.

In some embodiments, a station may provide a unicast or multicast presence indication based on whether the station is currently associated with an access point. For example, if a mobile station is in the associated state, the station may send a unicast presence indication in the current channel to the current access point. Also for example, if a mobile station is in the unassociated state, the station may send broadcast presence indications, in one or more channels as received from previous presence configuration requests.

FIG. 2 shows two presence indication transmissions at 240 and 250. When the mobile station is stationary, the time between transmissions 240 and 250 is the stationary power saving interval, and when the mobile station is in motion, the time between transmissions 240 and 250 is the in-motion power saving interval. In some embodiments, the presence indications include a Null frame (empty frame), or include minimal information. For example, a presence indication frame may only include pre-configured transmit power information. In some embodiments, no measurement is conducted while a station is in a power saving state. This allows a mobile station to send back its presence indication without involving upper MAC operation and conducting any measurement. This feature leaves most calculation and measurement on the access point side when the station is in a power saving state.

Figure 4:
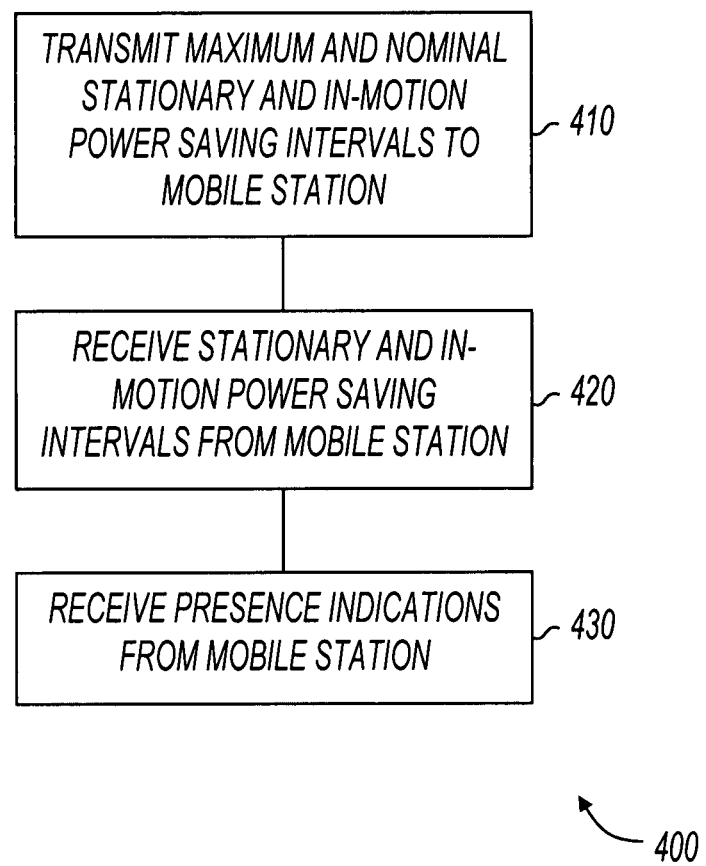
FIGS. 4 and 5 show flowcharts in accordance with various embodiments of the present invention.

FIG. 4 shows a flowchart in accordance with various embodiments of the present invention. In some embodiments, method 400 describes the operation of an access point in a wireless network. In some embodiments, method 400, or portions thereof, is performed by an access point, a network interface card, a processor, or an electronic system, embodiments of which are shown in the various figures. Method 400 is not limited by the particular type of apparatus, software element, or system performing the method. The various actions in method 400 may be performed in the order presented, or may be performed in a different order. Further, in some embodiments, some actions listed in FIG. 4 are omitted from method 400.

Method 400 is shown beginning at block 410 in which maximum and nominal stationary and in-motion power saving intervals are transmitted to one or more mobile stations as part of a presence configuration request. Examples of these fields are shown in FIG. 3. The presence configuration request may include additional information beyond these fields. At 420, a stationary power saving interval and an in-motion power saving interval are received from a mobile station as part of a presence configuration response.

At 430, the access point receives presence indications from the mobile station. When the mobile station is stationary and in a power saving state, the access point receives the presence indication every stationary power saving interval. When the mobile station is in-motion and in a power saving state, the access point receives the presence indication every in-motion power saving interval.

Figure 5:
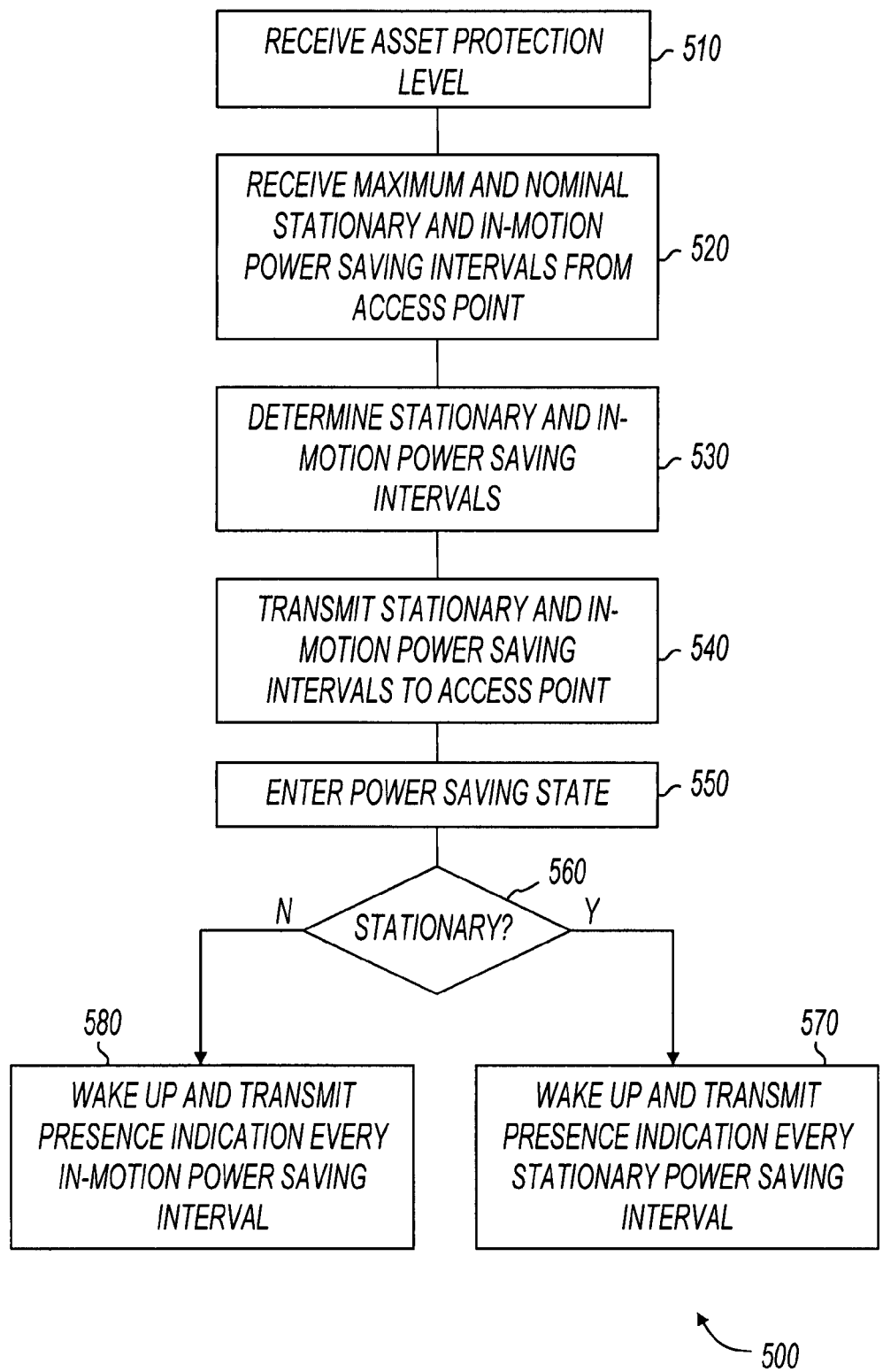

FIG. 5 shows a flowchart in accordance with various embodiments of the present invention. In some embodiments, method 500 describes the operation of a mobile station in a wireless network. In some embodiments, method 500, or portions thereof, is performed by a mobile station, a network interface card, a processor, or an electronic system, embodiments of which are shown in the various figures. Method 500 is not limited by the particular type of apparatus, software element, or system performing the method. The various actions in method 500 may be performed in the order presented, or may be performed in a different order. Further, in some embodiments, some actions listed in FIG. 5 are omitted from method 500.

Method 500 is shown beginning at block 510 in which an asset protection level is received. In some embodiments the asset protection level may be one piece of information included within configuration information received from a user or a system administrator. The asset protection level may have any number of levels. In some embodiments, the asset protection level is hard-coded into the mobile station, and is not modifiable by a user. In other embodiments, the asset protection level is received from an access point.

At 520, maximum and nominal stationary and in-motion power saving intervals are received from an access point as part of a presence configuration request. Examples of these fields are shown in FIG. 3.

At 530, the mobile station determines a stationary power saving interval and an in-motion power saving interval. In some embodiments, these intervals are determined as a function of the maximum and nominal intervals received at 520 and the asset protection level received at 510. For example, the stationary power saving interval may be between the nominal and maximum stationary power savings intervals, and the in-motion power saving interval may be between the nominal and maximum in-motion power savings intervals. The power savings intervals may be set longer for low asset protection levels, and may be set shorter for high asset protection levels. At 540, the stationary and in-motion power saving intervals are transmitted back to the access point as part of a presence configuration response.

At 550, the mobile station enters a power saving state (PSS). As described above, the power saving state may be any state in which the mobile station consumes less power. All or a portion of the mobile station may be powered down, or put to "sleep" in a power saving state.

At 560, the mobile station determines if it is stationary or in motion. This may be determined in any way. For example, a mobile station may look at its access point association history to determine if it is in motion. Also for example, the mobile station may receive broadcast packets from surrounding stations and access points, and determine whether it is remaining in the same place, or if it is in motion. The manner in which the mobile station determines whether it is stationary is not a limitation of the present invention.

If the mobile station is stationary, then at 570, the mobile station wakes up every stationary power saving interval and transmits a presence indication. If the mobile station is in motion, then at 560, the mobile station wakes up every in-motion power saving interval and transmits a presence indication. When a mobile station "wakes up" to transmit a presence indication, the mobile station may or may not enter a full power state from the reduced power state. For example, in some embodiments, the mobile station only wakes up circuitry used to transmit the presence indication, and the remainder of the mobile station remains in a low power state.

In some embodiments, at 560 and 570, the mobile station may transmit either unicast or broadcast presence indication frames. For example, if the mobile station is currently associated with an access point, the mobile station may transmit a unicast presence indication frame to the access point. Also for example, if the mobile station is not currently associated with an access point, the mobile station may transmit a broadcast or multicast presence indication. Further, the presence indication may be transmitted on one or more channels.

Figure 6:
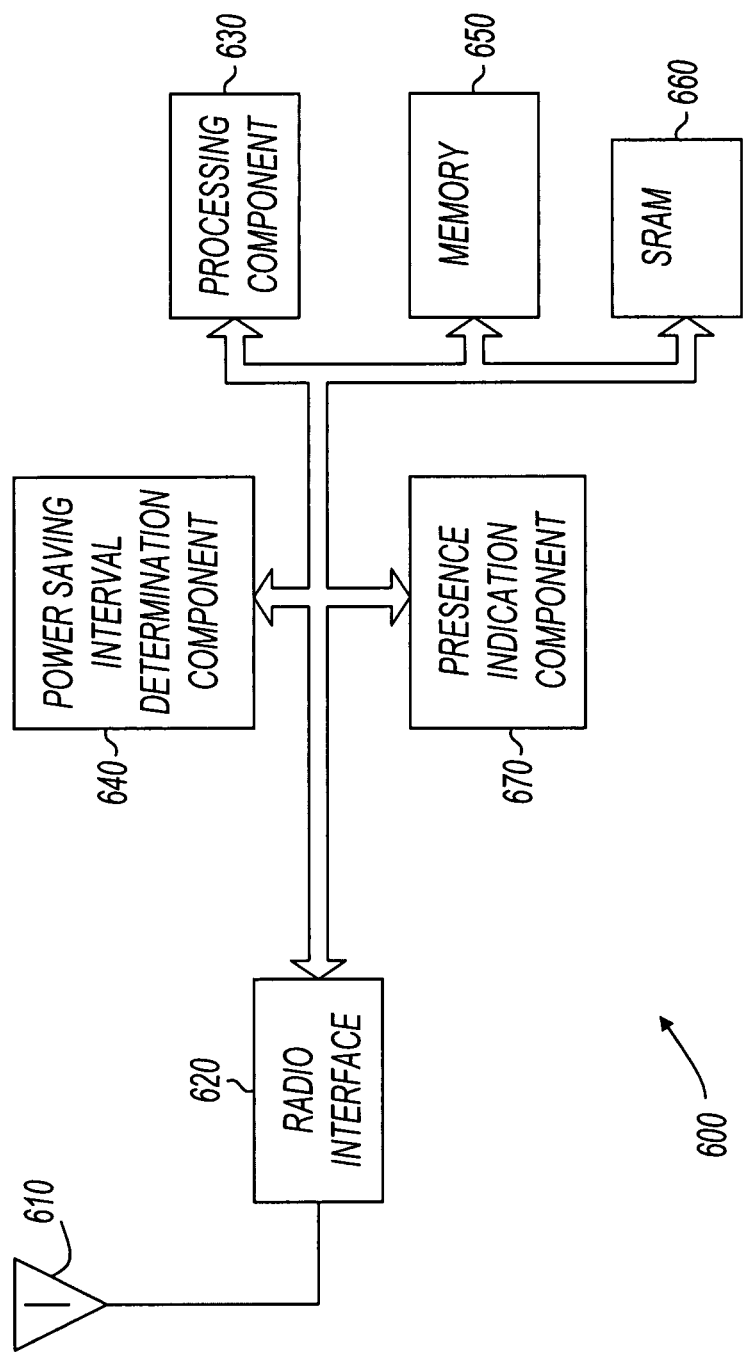
FIG. 6 shows a system diagram in accordance with various embodiments of the present invention.

FIG. 6 shows a system diagram in accordance with various embodiments of the present invention. Electronic system 600 includes antenna 610, radio interface 620, processing component 630, power saving interval determination component 640, presence indication component 670, memory 650, and static random access memory (SRAM) 660. In some embodiments, electronic system 600 may be an access point, a mobile station, a wireless interface, a NIC, or the like. For example, electronic system 600 may be utilized in network 100 as any of access point 102, mobile stations 110, 120, or 130, or NIC 114. Also for example, electronic system 600 may be an apparatus capable of performing any of the method embodiments described with reference to the previous figures.

In some embodiments, electronic system 600 may represent a system that includes a wireless interface as well as other circuits. For example, in some embodiments, electronic system 600 may be a computer, such as a personal computer, a workstation, or the like, that includes a wireless interface as a peripheral or as an integrated unit.

In operation, system 600 sends and receives signals using antenna 610, and the signals are processed by the various elements shown in FIG. 6. Antenna 610 may include one or more directional antennas or one or more omni-directional antennas. As used herein, the term omni-directional antenna refers to any antenna having a substantially uniform pattern in at least one plane. For example, in some embodiments, antenna 610 may include an omni-directional antenna such as a dipole antenna, or a quarter wave antenna. Also for example, in some embodiments, antenna 610 may include a directional antenna such as a parabolic dish antenna or a Yagi antenna. In some embodiments, antenna 610 forms an array capable of supporting spatial division multiple access (SDMA) or multiple-input multiple output (MIMO) communications. In other embodiments, antenna 610 includes only one physical antenna.

Radio interface 620 is coupled to antenna 610 to interact with a wireless network. Radio interface 620 may include circuitry to support the transmission and reception of radio frequency (RF) signals. For example, in some embodiments, radio interface 620 includes an RF receiver to receive signals and perform "front end" processing such as low noise amplification (LNA), filtering, frequency conversion or the like. Further, in some embodiments, radio interface 620 includes beamforming circuitry to support SDMA processing. Also for example, in some embodiments, radio interface 620 includes circuits to support frequency up-conversion, and an RF transmitter. The various embodiments of the invention are not limited by the contents or function of radio interface 620.

Processing component 630 may perform method embodiments of the present invention, such as method 400 (FIG. 4) or method 500 (FIG. 5), or methods represented by sequence 200 (FIG. 2). Processing component 630 represents any type of processor, including but not limited to, a microprocessor, a digital signal processor, a microcontroller, or the like. In some embodiments, processing component 630 may be capable of one or more power saving states. For example, processing component 630 may enter a suspended state, a hibernate state, or the like, to reduce power consumption.

Power saving interval determination component 640 may determine stationary and in-motion power saving intervals based on information received from users and networks. For example, power saving interval determination component 640 may include asset protection level information and may perform the actions of block 530 (FIG. 5). Power saving interval determination component 640 may be implemented in hardware, software, or any combination thereof. For example, power saving interval determination component 640 may be implemented in software that is executed by processing component 630, or may be implemented in hardware in an integrated circuit separate from processing component 630.

Presence indication component 670 provides presence indication frames using radio interface 620 and antenna 610. As described above, presence indication component 670 may provide presence indications at different intervals based on whether electronic system 600 is in motion or is stationary. Presence indication component 670 may be implemented in hardware, software, or any combination thereof. For example, presence indication component 670 may be implemented in software that is executed by processing component 630, or may be implemented in hardware in an integrated circuit separate from processing component 630.

Memory 650 represents an article that includes a machine readable medium. For example, memory 650 represents a random access memory (RAM), dynamic random access memory (DRAM), static random access memory (SRAM), read only memory (ROM), flash memory, or any other type of article that includes a medium readable by processing component 630. Memory 650 may store instructions for performing the execution of the various method embodiments of the present invention. Static random access memory (SRAM) 660 is a volatile memory that may hold information during operational periods of system 600. In some embodiments, SRAM 660 is omitted.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A method comprising:
   wirelessly receiving, by a mobile computing device from an access point, indicators of first and second intervals of time;
   configuring the mobile computing device with the first interval and the second interval, the first interval corresponding to a time period that the mobile computing device spends in a reduced power state between periodic transmissions by the mobile computing device when stationary, and the second interval corresponding to a time period that the mobile computing device spends in a reduced power state between periodic transmissions by the mobile computing device when in motion;
   wherein the first time period is different than the second time period; and
   wherein the receiving comprises receiving a maximum stationary interval and a maximum in-motion interval from the access point.

2. The method of claim 1 further comprising transmitting a periodic frame every first interval when the mobile computing device is stationary.

3. The method of claim 2 further comprising transmitting a periodic frame every second interval when the mobile computing device is in motion.

4. The method of claim 2, the transmitting a periodic frame comprising transmitting a unicast frame to an access point when associated with the access point.

5. The method of claim 2, the transmitting a periodic frame comprising transmitting a multicast frame when the mobile computing device is not associated with an access point.

6. The method of claim 5, the transmitting a periodic frame comprising transmitting a multicast frame on a single 802.11 channel.

7. The method of claim 5, the transmitting a periodic frame comprising transmitting a multicast frame on multiple 802.11 channels.

8. The method of claim 1, the receiving further comprising receiving a nominal stationary interval and a nominal in-motion interval from the access point.

9. The method of claim 8, the receiving further comprising selecting the first interval between the maximum and nominal stationary interval, and selecting the second interval between the maximum and nominal in-motion interval.

10. The method of claim 1, the configuring comprising determining the first interval based on a user setting.

11. The method of claim 10, the configuring comprising determining the second interval based on a user setting.

12. The method of claim 11, the user setting corresponds to the asset protection level.

13. The method of claim 1, the first and second intervals comprising power saving intervals.

14. The method of claim 1, the periodic transmissions comprising presence indication transmissions.

15. An article having a non-transitory machine readable medium with instructions stored thereon that when accessed and executed result in a mobile computing device:
- receiving, at the mobile computing device, interval information from an access point;
- determining a stationary interval and an in-motion interval based on the interval information received from the access point;
- entering a low power state; and
- waking from the low power state to transmit a periodic frame every stationary interval when the mobile computing device is stationary, and waking from the low power state to transmit a periodic frame every in-motion interval when the mobile computing device is in motion;
- wherein the stationary interval is different than the in-motion interval; and wherein the receiving comprises receiving a maximum stationary interval and a maximum in-motion interval from the access point.

16. The article of claim 15, the receiving interval information comprising receiving a nominal stationary interval.

17. The article of claim 15, the asset protection level is based on a user selection.

18. The article of claim 15, the receiving interval information from an access point comprising receiving power saving interval information.

19. The article of claim 15, the transmitting a periodic frame comprising transmitting a presence indication frame.

20. An apparatus comprising:
- a hardware processing component comprising a plurality of power states, the hardware processing component to enter a low power state during a power saving interval;
- a radio interface to wirelessly receive from an access point, indicators of a power saving interval having a first duration and a second duration shorter than the first duration; and
- a hardware component to command the hardware processing component to wake up and command the radio interface to transmit a periodic frame every power saving interval, the power saving interval to have the first duration when the hardware processing component is stationary and the second duration when the hardware processing component is in motion;
- wherein the indicators comprise a maximum stationary interval and a maximum in-motion interval.

21. The apparatus of claim 20, the periodic frame comprising a presence indication frame.

22. The apparatus of claim 20, the interval comprising a power saving interval.

23. The apparatus of claim 20, further comprising an interval determination hardware component to determine the interval.

24. The apparatus of claim 20, the asset protection level based on a user selection.

25. The apparatus of claim 20 further comprising a static random access memory communicably coupled to the hardware processing component.

* * * * *